UNITED STATES PATENT OFFICE.

FRANZ ELGER, OF BASEL, SWITZERLAND, ASSIGNOR TO HOFFMANN-LA ROCHE CHEMICAL WORKS, OF NEW YORK, N. Y., A CORPORATION OF NEW YORK.

NON-HYGROSCOPIC MALT-EXTRACT PREPARATIONS AND PROCESS FOR MAKING THE SAME.

1,100,176. Specification of Letters Patent. Patented June 16, 1914.

No Drawing. Application filed February 27, 1914. Serial No. 821,453.

*To all whom it may concern:*

Be it known that I, FRANZ ELGER, a subject of the Austro-Hungarian Empire, and a resident of Basel, Switzerland, have invented Non-Hygroscopic Malt-Extract Preparations and Process for Making the Same, of which the following is a specification.

The object of this invention is to produce malt extract preparations suitable for food purposes, and particularly such as are suitable for dietetic purposes, in such manner that the marked hygroscopic qualities of malt extract are neutralized or overcome.

Malt extract is known to be a very hygroscopic substance. Exposed to the air it attracts water to such an extent that even after a short time, the dry powder is converted into a pasty condition. Not only does this hygroscopic property of malt extract interfere with handling the substance, but the food products which contain hygroscopic malt extract have a tendency to deteriorate in value. The presence of water in malt extract resulting from this hygroscopic action has a further disadvantage that it tends to change the chemical constitution of the preparations. For example, malt extracts which have absorbed 25% of water readily ferment and create in the preparation a tendency to the formation of mold. Accordingly, malt extracts, and all preparations which contain malt extract, have had to be carefully stored and handled in order to prevent, under the varying conditions of use, the hygroscopic activity of the malt extract from affecting it or the preparations containing it. Many attempts have been made to neutralize, destroy or overcome this hygroscopic quality of malt extract, but without success. Finally, the discovery was made that the addition to the malt extract of casein calcium will result in a preparation which no longer exhibits the deleterious qualities of the malt extract. Casein calcium is a white tasteless granular powder, readily soluble in water, having a food value of its own which harmonizes with the food value of malt extract. The preferred form of casein calcium is that described in Letters Patent No. 1,087,515, issued on application of Philip Sprenger and Aegidius Tschudi, on February 17, 1914. In spite of the fact that malt extract has a marked hygroscopic quality and that the casein calcium is readily soluble in water, a proper mixture of these two substances results in a non-hygroscopic dry preparation.

Good results are obtained by mixing, for example, one part casein calcium and two parts of malt extract. Even after long exposure to air, such a preparation does not exhibit any indications of change, but the powder remains dry and does not become pasty or packed together.

The preparation may be made by direct mixing of dry malt extract with dry casein calcium, or these two substances may be dissolved together and the solution evaporated by appropriate means until a dry product is obtained.

What is claimed is:—

1. A dietetic preparation in the form of a dry, non-hygroscopic powder composed of a mixture of malt extract and casein calcium.

2. The process of rendering malt extract non-hygroscopic, which consists in adding to it casein calcium, mixing the said two substances together and storing them in the form of a dry powder.

In testimony whereof I have hereunto set my hand in the presence of two subscribing witnesses.

FRANZ ELGER.

Witnesses:
ARNOLD ZÜBER,
PETER METZGER.